United States Patent [19]

Iizuka et al.

[11] Patent Number: 4,683,715
[45] Date of Patent: Aug. 4, 1987

[54] METHOD OF STARTING GAS TURBINE PLANT

[75] Inventors: Nobuyuki Iizuka; Katsukuni Hisano; Ryoichiro Oshima; Katsuo Wada; Fumiyuki Hirose; Michio Kuroda; Yoshihiro Uchiyama; Yoji Ishibashi; Isao Sato; Hiroshi Inose, all of Hitachi, Japan

[73] Assignee: Hitachi, Ltd., Tokyo, Japan

[21] Appl. No.: 807,945

[22] Filed: Dec. 12, 1985

[30] Foreign Application Priority Data

Dec. 14, 1984 [JP] Japan ................................ 59-262782

[51] Int. Cl.⁴ .............................................. F02C 7/26
[52] U.S. Cl. ................................. 60/39.06; 60/39.141; 60/733
[58] Field of Search ................... 60/39.02, 39.06, 39.27, 60/732, 733, 746, 747, 39.141

[56] References Cited

U.S. PATENT DOCUMENTS

| 4,265,615 | 5/1981 | Lohmann et al. | 60/746 |
| 4,292,801 | 10/1981 | Wilkes et al. | 60/747 |
| 4,420,929 | 12/1983 | Jorgensen et al. | 60/733 |
| 4,603,548 | 8/1986 | Ishibashi et al. | 60/39.06 |

OTHER PUBLICATIONS

Aoyama et al., "Development of a Dry Low NOx Combustor for a 120 MW Gas Turbine"–ASME paper No. 84-GT-44, published Jun., 1984.

Primary Examiner—Louis J. Casaregola
Attorney, Agent, or Firm—Antonelli, Terry & Wands

[57] ABSTRACT

A method of starting a gas turbine plant, which plant has at least one combustor including a primary combustion chamber into which primary fuel nozzles open and a secondary combustion chamber into which secondary fuel nozzles open, a compressor for supplying the combustor with compressed combustion air, and a gas turbine driven by the combustion gas generated in the combustor and adapted to drive a load such as an electric power generator. When the gas turbine is being accelerated to a rated speed or while the load is still below a normal load range, a fuel is supplied only to the primary fuel nozzle, whereas, in other loaded operation range, the fuel is supplied to both the primary and secondary fuel nozzles. Before the fuel supply to the secondary fuel nozzles is commenced, a part of the compressed air is bled through at least one air bleed pipe leading from the compressor and having an air bleed valve. The air bleed valve is controlled in such a manner that the opening degree thereof is maximized when the fuel supply to the secondary fuel nozzles is commenced and is progressively decreased in accordance with the increase of the load such as to become substantially zero when the load has been increased to the normal load range.

4 Claims, 8 Drawing Figures

METHOD OF STARTING GAS TURBINE PLANT

BACKGROUND OF THE INVENTION

The present invention relates to a method of and an apparatus for starting a gas turbine plant, particularly a gas turbine plant incorporating at least one two-stage combustion type combustor for suppressing the generation of NOx.

In recent years, plans have been proposed in Japan for development of a complex cycle power-generating plant in which a gas turbine plant and a steam turbine plant are combined, in order to meet the demands for the saving of energy and the preservation of natural resources. At the same time, in Japan, there are strict requirements of regulations for controlling exhaust emissions from gas turbines, in order to prevent pollution. Unfortunately, existing gas turbine combustors cannot clear the levels required by the regulations, particularly in connection with nitrogen oxides (NOx), and this is the reason why the development of combustors which generate less NOx is becoming a matter of urgency.

An effective method of suppressing the generation of NOx in gas turbine combustors is to supply the fuel to a plurality of portions of the combustor so that combustion is completed in a plurality of stages according to the load on a gas turbine. The most practical form of this type of combustion system is the so-called two-stage combustion system which has been already put to practical use.

The two-stage combustion type combustor has a primary combustion chamber for the combustion of a primary fuel and a secondary combustion chamber downstream from the primary combustion chamber and adapted for the combustion of a secondary fuel at a comparatively high load range. The ignition of the secondary fuel in the secondary combustion chamber is effected by the flame generated in the primary combustion chamber, so that the fuel-air ratio of the mixture to be burnt in the secondary combustion chamber can be large, i.e., the mixture can be lean, which, as is well known to those skilled in the art, suppresses the generation of NOx during the combustion.

In general, the rate of fuel supply to a gas turbine plant changes substantially in proportion to the load, whereas the rate of supply of air from the compressor is substantially constant, because the speed of the gas turbine is almost constant. This inevitably causes the fuel-air ratio to be changed. Therefore, a problem is encountered in that the mixture of an fuelair ratio optimized for a specific load range is often too rich or too lean in other load ranges, resulting in an increased emission of noxious components such as NOx, CO and HC.

To obviate this problem, as shown in ASME paper 84-GT-44 (Oct. 1, 1984), it has been proposed to provide a gas turbine with a by-pass passage through which a part of the compressed air is introduced directly into the downstream side of the combustor, together with a suitable means for controlling the flow rate of the air through this by-pass passage in accordance with the load of the gas turbine.

In this known arrangement, the variable area of the by-pass passage has to be large enough to provide the required secondary air flow rate. This, however, is generally difficult to attain, owing to restrictions on the structure of a gas turbine. In consequence, the gas turbine operation with both the primary and secondary combustions is possible only in comparatively heavy load range. During steady operation of the gas turbine, therefore, the switching of operation from a primary combustion mode to a primary and secondary combustion mode takes place at a comparatively high level of load, accompanied by abnormal combustion pulsation.

For the purpose of suppressing the combustion pulsation, the switching from the primary combustion mode to the primary and secondary combustion mode is preferably conducted while the load level is comparatively low.

SUMMARY OF THE INVENTION

Accordingly, an object of the invention is to provide a method of and apparatus for starting a gas turbine plant having at least one two-stage combustion type combustor, in which the switching of operation from the primary combustion mode to the primary and secondary combustion mode is conducted in a comparatively light load level.

Another object of the invention is to provide a method of and apparatus for starting a gas turbine plant having a denitrification device disposed in its exhaust gas passage so as to remove the nitrogen oxides contained in the exhaust gas, improved such as to permit a rapid temperature rise and, therefore, a quick activation of the denitrification device.

According to the present invention, during starting of a gas turbine plant having at least one two-stage combustion type combustor, a part of the compressed air supplied from a compressor is bled off so as to reduce the rate of air supply to the combustor after the ignition of the primary fuel but before the supply of the secondary air and, thereafter, the secondary fuel is supplied and ignited by the flame of the primary combustion, followed by a progressive decrease in the rate of bleeding of the compressed air in accordance with the increase of the load of the gas turbine.

DESCRIPTION OF THE PRIOR ART

Figure 1:
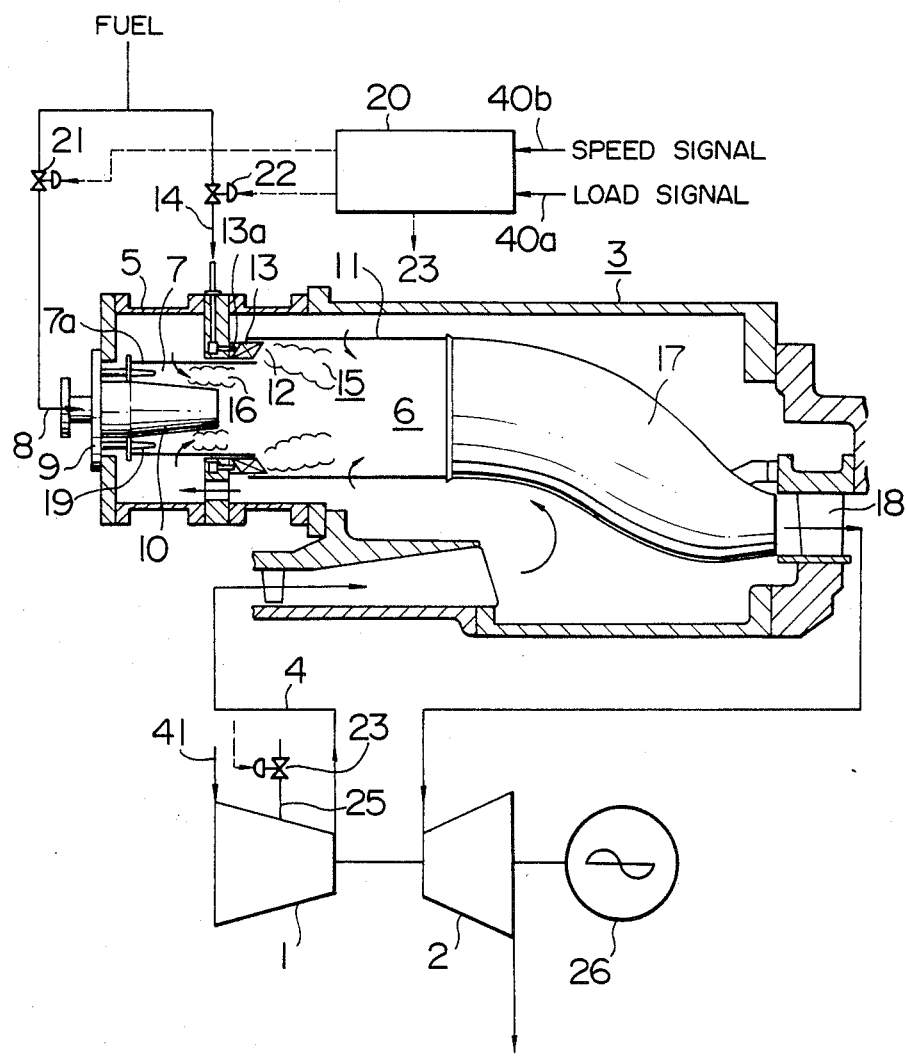
FIG. 1 is a schematic system diagram of a gas turbine plant to which the invention is applied.

FIG. 1 is a schematic system diagram of a gas turbine plant to which the present invention is applied. Air 4 compressed by an air compressor 1 of the gas turbine plant is supplied to a combustor 3 thereof. The air is then introduced into primary and secondary combustion chambers 7 and 6 through primary air supply ports formed in the peripheral wall 7a of the primary combustion chamber 7 and the secondary air supply ports formed in the peripheral wall 11 of the secondary combustion chamber 6 to be used as combustion air. The downstream end of the secondary combustion chamber 6 is arranged so that the combustion gas therefrom is introduced to stationary vanes or blades 18 of a gas turbine 2 through a tail pipe 17. A cone 10 is disposed at the center of the primary combustion chamber 7 so as to extend axially from an end bracket 9. Primary fuel is supplied from a multiplicity of primary fuel nozzles 19 provided on the end bracket 9 into an annular space formed between the cone 10 and the peripheral wall 7a. The secondary combustion chamber 6 has a diameter greater than that of the primary combustion chamber 7. A ring-shaped secondary fuel supply swirler 13 is provided at the junction 12 between the primary and secondary combustion chambers 7 and 6. Secondary fuel from secondary fuel nozzles 13a and the secondary air are mixed with each other within the secondary fuel supply swirler 13. The primary fuel nozzles 19 and the secondary fuel nozzles 13a are connected to a common fuel source (not shown) through fuel lines 8 and 14 having fuel control valves 21 and 22, respectively. The control valves 21 and 22 are controlled by signals from a controller 20 which operates in response to a speed signal 40b representing the speed of the gas turbine 2 and a load signal 40a representing the load applied to the gas turbine 2. The controller 20 also produces an output which is used as a control signal for controlling an air-bleed valve 23 which is disposed in an air bleeding line 25 leading from an intermediate stage of the compressor 1. A reference numeral 26 denote the load on the gas turbine 2, e.g., a generator.

An explanation will be made hereinunder as to a method of the invention for starting the gas turbine plant. In general, the starting up of the gas turbine 2 is conducted with the generator 26 in the unloaded condition, and the generator is loaded only after the gas turbine has been accelerated to a rated speed.

Figure 2:
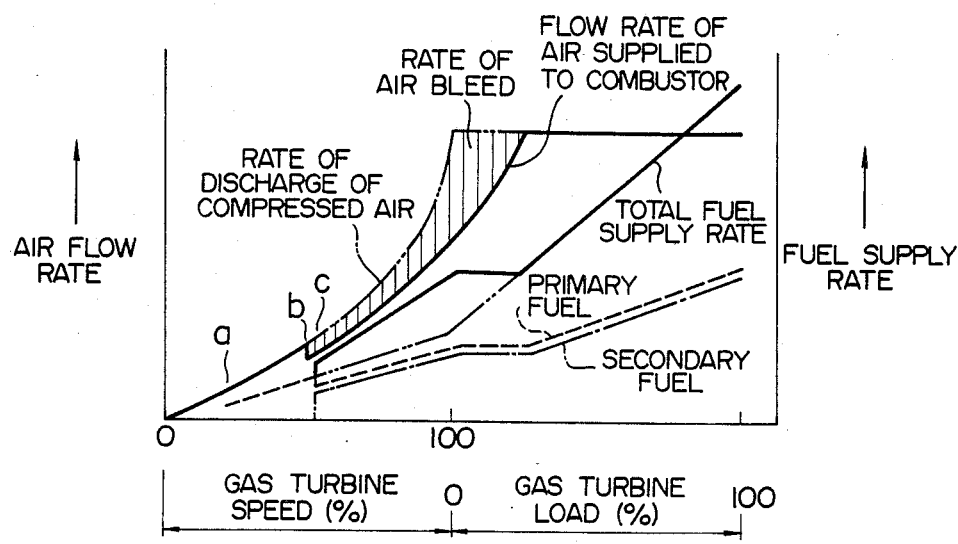
FIG. 2 is a graph showing how the rates of supply of air and fuel are changed in relation to changes in the load level.
Figure 3:
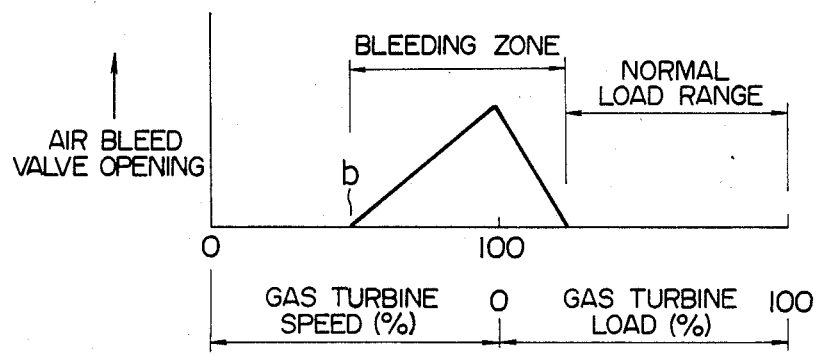
FIG. 3 is a diagram showing bleed valve opening characteristics.

FIG. 2 is a graph showing changes in the flow rates of air and primary and secondary fuels in relation to changes in the gas turbine speed and gas turbine load. The discharge air flow rate of the compressor 1 is increased substantially along a curve of secondary degree until the turbine is accelerated to the rated speed (100%) and, thereafter, is maintained substantially constant regardless of the load level because the speed of the gas turbine is constant however the load on the generator 26 may be changed. In starting up the gas turbine 2, the compressor 1 is driven by another power means and, when the compressor speed has been increased to a level (a) at which a predetermined air discharge rate is obtained, the primary fuel is supplied through the primary nozzles 19 and ignited by an ignition device (not shown), so that the gas turbine 2 is self-driven and accelerated as the rate of fuel supply is increased. When the turbine speed has reached a point (b), the air-bleed valve 23 is opened as shown in FIG. 3 such as to relieve a part of the air from the compressor 1 to the atmosphere, so that the rate of air supply to the combustor 3 is decreased as shown by solid-line curve in FIG. 2. At a point (c) after the commencement of air-bleeding, the secondary fuel is supplied in a stepped manner, while the rate of supply of the primary fuel is decreased also in a stepped manner as shown by a brokenline. The secondary fuel is ignited by flames 16 propagated from the primary combustion chamber, without delay from the commencement of supply, thus forming secondary flames 15. Once the secondary fuel is ignited, the gas turbine 2 operates with both primary and secondary fuels, while the opening degree of the air-bleed valve 23 is progressively increased from the point (b) as shown in FIG. 3, and is maximized when the turbine speed has reached the vicinity of the rated speed. Then, the opening degree of the air-bleed valve 23 is progressively decreased as the load on the gas turbine is increased, such that the air-bleeding rate is reduced substantially to zero when the load on the gas turbine has been increased to a normal load range which is usually between 25% and 100%. The total amount of the primary and secondary fuels is changed after the point (c) as shown by a solid line in FIG. 2. It will be seen that the total fuel supply rate required when the air bleeding is conducted is somewhat greater than that (shown by a two-dot-and-dash line) required when the air-bleeding is not conducted. This is because the gas turbine 2 requires an additional fuel in order to compensate for a reduction in the power of the gas turbine 2 attributable to a reduction in the air supply rate to the combustor 3. Namely, the automatic control system functions to control the total fuel supply such as to maintain the output power or speed of the gas turbine matching for a given load signal 40a or speed signal.

Figure 4:
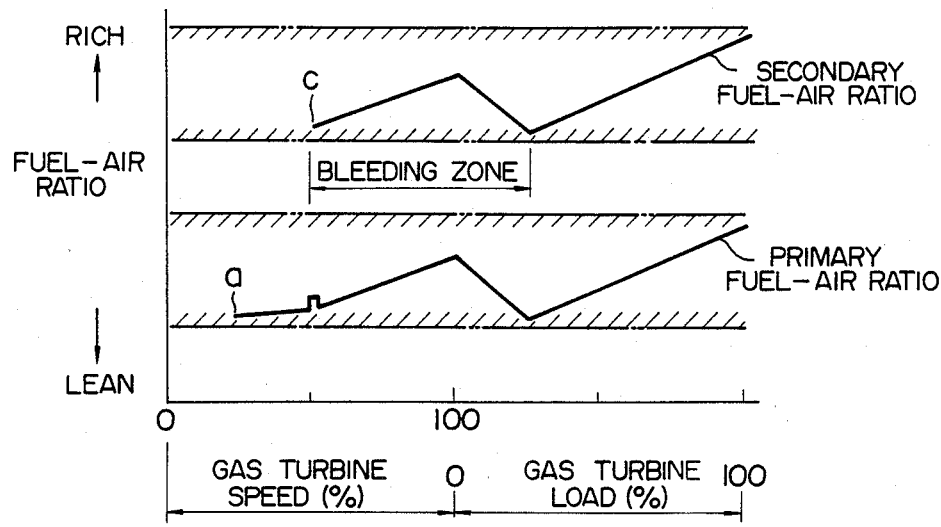
FIG. 4 is a graph showing fuel-air ratio characteristics.

FIG. 4 shows primary and secondary fuel-air ratio characteristics which are obtained when the primary and secondary fuels are controlled in accordance with the respective fuel flow rate characteristics shown by the broken-line and one-dot-and-dash line in FIG. 2. The optimum range of each fuel-air ratio in this combustor is shown by a hatched area in this Figure. The upper or richer limit of each optimum range is determined by the threshold condition for generating NOx, whereas the lower or leaner limit of the same is determined as the threshold condition for generation of CO or HC.

The primary fuel-air ratio is defined as the ratio between the amount of primary fuel supplied to the primary combustion chamber 7 and the amount of air supplied to the same, the air including both primary combustion air and cooling air. Similarly, the secondary fuel-air ratio is given as the ratio between the amount of the secondary fuel supplied to the secondary combustion chamber 6 and the amount of air supplied to the same, the air including both secondary combustion air and cooling air.

Thus, the primary and secondary fuel-air ratios are given by the following formulae:

$$\text{primary fuel-air ratio} = \frac{\text{amount of primary fuel}}{\text{amount of air supplied to primary combustion chamber}}$$

$$\text{secondary fuel-air ratio} = \frac{\text{amount of secondary fuel}}{\text{amount of air supplied to secondary combustion chamber}}$$

Referring to FIG. 4, the optimum range of fuel-air ratio for the combustion in the primary combustion chamber 7 is somewhat different from that in the secondary combustion chamber 6. This is attributable to the difference in the combustion system: namely, a fact that the combustion in the primary combustion chamber is diffusion combustion, while the combustion in the secondary combustion chamber is pre-mixing combustion. That is, the different types of combustion require different optimum ranges of fuel-air ratio, and the optimum fuel-air ratio range is determined on condition of the type of combustion. The rates of supply of combustion air and fuel to the respective combustion chambers, therefore, should be determined such that the actual fuel-air ratios fall within the respective optimum fuel-air ratio ranges over the entire range of operation of the gas turbine. The total fuel supply rate of the gas turbine is substantially proportional to the load thereon. When the supply of air and fuel is controlled such that the primary and secondary fuel-air ratios take maximum values, i.e., the mixtures are richest, within the optimum ranges at 100% load, therefore, each air fuel ratio at 0% load comes down below the lower limit of each optimum range, i.e., the mixture becomes leaner beyond the limit so that the stable combustion cannot be maintained unless the air-bleeding is conducted.

According to the invention, therefore, the air-bleeding is conducted and controlled in the operation region in which the fuel-air ratios approach the respective lower limits of the fuel-air ratios as shown in FIG. 4, so that the combustions in both combustion chambers are performed within the respective optimum ranges of fuel-air ratios over the entire region of the gas turbine operation.

The control of the primary and secondary fuel and the control of the bleed air are performed by means of the fuel control valves 21, 22 and the air-bleed valve 23 which are under the control of the controller 20 operative in response to the gas turbine speed signal 40b and the load signal 40a. As will be seen from FIG. 3, the air-bleed valve 23 is opened to bleed the air only within the operation region in which the gas turbine is being accelerated or in which the load is below the normal load range. Therefore, the air bleeding of large volume causes a reduction in the efficiency only when the turbine is being started up or accelerated, and does not cause any reduction in the efficiency in the normal load range. This in turn permits the fuel-air ratios in the air-bleeding zone shown in FIG. 4 to be optimized for the combustions and to commence the supply of the secondary fuel at the point (c) before the rated gas turbine speed is reached.

The commencement of supply of the secondary fuel at the point (c) in the region of low gas turbine speed causes only a small change in the combustion energy when the combustion mode is changed from the primary combustion mode to the primary and secondary combustion mode, so that the magnitude of the pulsation attributable to a non-linear change in the combustion is decreased advantageously.

The aforementioned conventional method relying upon the control of by-pass air encounters a problem in that the mixture tends to become too lean during no-load operation at the rated speed resulting in an increase in the noxious components such as HC and CO, due to the presence of a practical limit in the increase of the by-pass air flow rate. In this conventional method, therefore, the gas turbine has to be operated only with the primary fuel even after the rated speed has been reached, until the load is increased to about 25%, and the supply of the secondary fuel is commenced only after the required amount of fuel has been increased beyond that at this load level. Consequently, the combustion pulsation of a large magnitude is caused when the operation mode is changed from the primary combustion mode to the primary and secondary combustion mode.

In contrast, according to the invention, it is possible to form the secondary flames or switch the operation mode from the primary combustion mode to the primary and secondary combustion mode even when the gas turbine is being accelerated to the rated speed, so that the magnitude of the combustion pulsation is small. In addition, both the primary and secondary flames are maintained during the turbine operation at the normal load range, i.e., the switching between two combustion modes does not take place even when the load level is changed within the normal load range, so that the gas turbine can operate stably.

Figure 5:
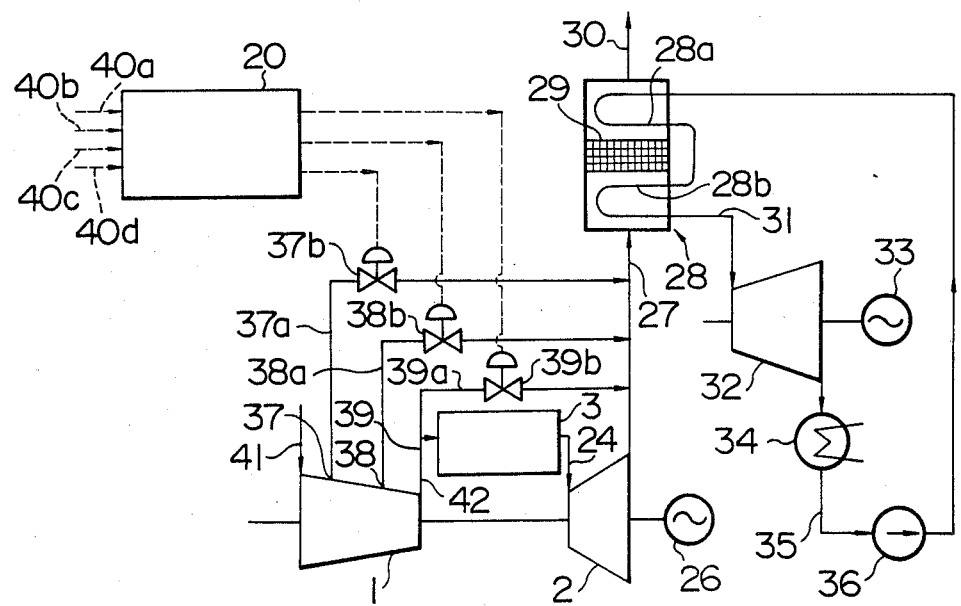
FIG. 5 is a system diagram of a complex cycle plant to which the invention is applied.

FIG. 5 shows another embodiment of the invention which is applied to a complex cycle plant in which a gas turbine and a steam turbine are combined. Ambient air 41 is sucked and compressed by a compressor 1 and the compressed air 42 is supplied to a two-stage combustion type combustor 3 in which primary and secondary fuels are burnt. The combustion gas 24 generated as a result of the combustion drives a gas turbine 2, and the hot gas 27 exhausted from the gas turbine 2 is introduced into a heat recovery boiler 28 in which are provided an evaporator 28a, superheater 28b and a denitrification device 29 for removing NOx from the exhaust gas. The gas 30 thus cleaned is discharged from a stack into the atmosphere. On the other hand, the steam 31 generated in the heat recovery boiler 28 is introduced to a steam turbine 32 thereby driving the same and, hence, a generator 33 connected thereto. The expanded steam from the steam turbine 32 is condensed in a condenser 34 to become a condensate 35 as a result of a heat exchange with a cooling medium such as, for example, sea water, and the condensate is returned to the boiler 28 by a feedwater pump 36.

Figure 6:
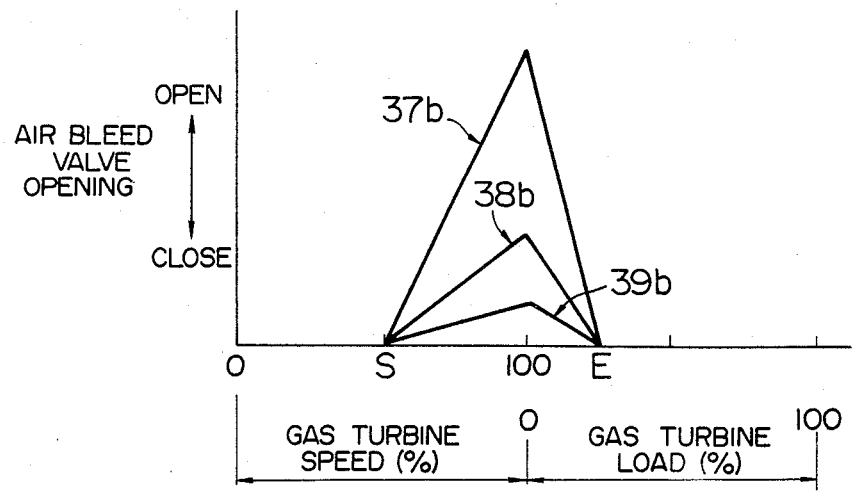
FIG. 6 is a diagram showing bleed valve opening characteristics.
Figure 7:
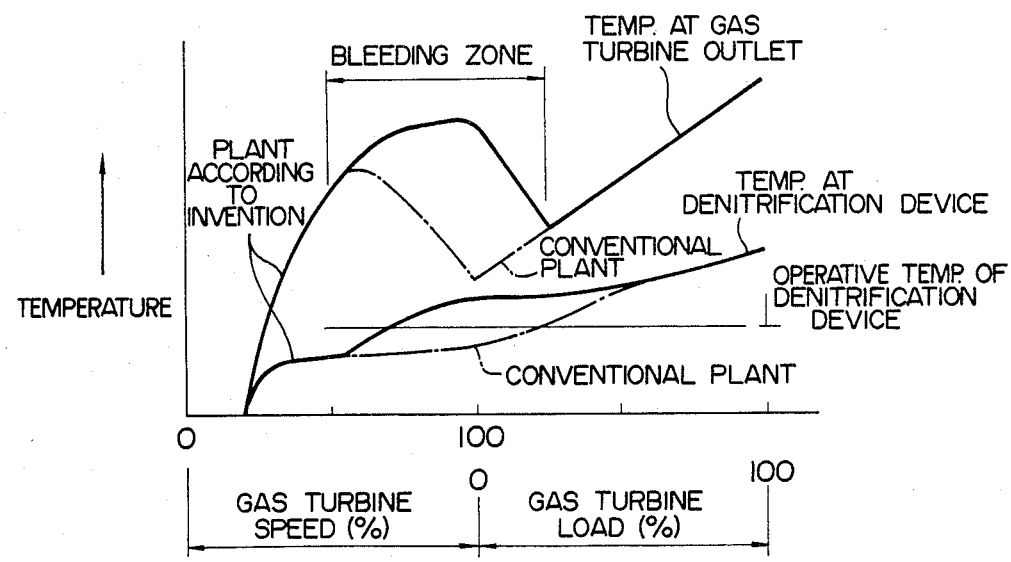
FIG. 7 is a graph showing the changes in the exhaust gas temperature and the temperature of a denitrification device in relation to changes in the load level.

Air bleed pipes 37a, 38a and 39a having air bleed valves 37b, 38b, 39b are connected to the low pressure stage 37 of the compressor 1, the intermediate pressure stage 38 and the compressed air supply pipe 39 leading to the combustor 3, respectively. The other ends of the air bleed pipes are connected to the inlet side of the heat recovery boiler 28. The air bleed valves 37b, 38b and 39b operate in response to control signals from a controller 20 which is adapted to control the supply of the primary and secondary fuels to the combustor 3, as well as the opening degrees of the air bleed valves 37b, 38b and 39b, upon receipt of signals such as a gas turbine load signal 40a, speed signal 40b, ambient air temperature signal 40c, ambient air humidity signal 40d and so forth. In this embodiment, the control of supply of the primary and secondary fuels to the combustor 3 is performed substantially in accordance with the same characteristics as those for the first embodiment explained with reference to FIG. 2, so that no further explanation will be needed in this connection. FIG. 6 shows the manner in which the air bleed valves are controlled. The bleeding of air from the compressor shows a tendency that the lower the pressure of a portion at which the bleeding of air is conducted, the more a reduction in the efficiency of the plant as a whole is decreased. It is practically impossible, however, to ensure the required flow rate of the bleed air by the bleeding of air only from the low pressure stage of the compressor, because of the risk of surging of the compressor. For this reason, it is desirable to design that the air is bled from a plurality of stages of the compressor, e.g., from the low-pressure stage, intermediate-pressure stage and high-pressure stage, and the proportion of the bleeding from the low-pressure stage to the whole bleed air is increased without causing any surging of the compressor.

In this embodiment, therefore, the opening degrees of the air bleed valves are controlled to maintain the required flow rate of the bleed air by means of the total of the flow rates of three valves such that the air bleed valve 37b from the low-pressure stage is opened most largely, while the air bleed valve 39b from the high-pressure stage is opened least, as will be seen from FIG. 6 in which the lines denoted by the same numerals as those of the air bleed valves show the degrees of opening of the corresponding air bleed valves. Although in FIG. 6 all the air bleed valves commence and cease the air bleeding at the same instants S and E, this is not exclusive and the air bleed valves can have different opening and closing timings from each other.

In the embodiment shown in FIG. 5, the primary and secondary fuel-air ratios can be maintained within preselected ranges, by virture of the fact that the bleeding of air from the compressor 1 is conducted when the gas turbine is being accelerated to the rated speed and when the load is in light-load region below the normal load region. Therefore, the gas turbine operation in the air bleeding zone requires an additional fuel supply as compared with the operation in the case that the air bleeding is not conducted, as explained before in connection with FIG. 2. In consequence, the exhaust gas temperature at the turbine outlet during the acceleration of the gas turbine after the start is high as compared with the conventional case in which the air bleeding is not conducted during acceleration. The higher exhaust gas temperature correspondingly raises the temperature of the denitrification device 29 and, hence, shortens the time required for the activation of the catalyst of the denitrification device. That is, the additional fuel which is required for the purpose of early air bleeding is effectively utilized in heating up of the denitrification device 29 of the heat recovery boiler 28.

In the embodiment shown in FIG. 5, the arrangement is such that the bleed air is introduced into the exhaust gas 27 from the gas turbine 2, in order to minimize the lengths of the air bleed pipes 37a, 38a and 39a. However, the arrangement may be such that the bleed air is discharged directly to the atmosphere or into the exhaust gas 30 at the outlet of the boiler 28. Such an arrangement will permit a quicker temperature rise of the denitrification device 29.

Figure 8:
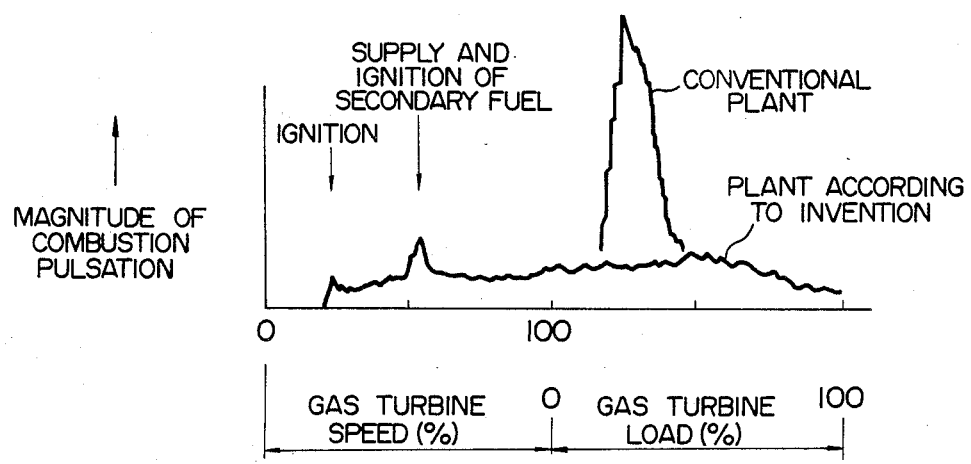
FIG. 8 is a graph showing the measured values of amplitude of pulsative combustion.

FIG. 8 shows the result of measurement of the magnitude of the combustion pulsation during starting up of the plant shown in FIG. 5. Although a peak of pulsation magnitude appears at a moment when the secondary fuel is ignited, this peak is very low and does not cause any substantial problem. The magnitude of the combustion pulsation in the conventional system, measured when the secondary fuel is ignited at 20% load operation of the gas turbine, is shown in the same Figure. It will be seen that the peak of the magnitude in the conventional system is about 4 (four) times as large as that that in the system embodying the present invention.

As will be understood from the foregoing description, according to the starting method of the invention, the bleeding of air from the compressor is conducted so as to reduce the rate of air flowing into the combustor, when the secondary fuel is ignited in the two-stage combustion type combustor, so that the fuel-air ratios in the combustor are maintained always within predetermined optimum ranges. Furthermore, the bleeding of air permits the ignition of the secondary fuel during acceleration of the gas turbine, so that the combustion pulsation at the time of ignition of the secondary fuel is remarkably suppressed.

It is also to be noted that, since the primary and secondary fuels are supplied simultaneously whenever the gas turbine operates within the normal load range, the combustion is stabilized advantageously.

In the case of a plant in which a denitrification device is incorporated for the purpose of removing nitrogen oxides from the exhaust gas of the gas turbine, the heating time required for heating the denitrification device up to the active temperature is shortened remarkably.

What is claimed is:

1. A method of starting a gas turbine of the type having: at least one combustor including a primary combustion chamber provided with means for supplying primary fuel thereinto and primary air supply ports, and a secondary combustion chamber downstream from said primary combustion chamber and provided with means for supplying secondary fuel into said secondary combustion chamber and secondary air supply ports; a compressor for supplying said combustor with compressed combustion air; and a gas turbine driven by a combustion gas generated in said combustor; said method comprising: commencing bleeding of a part of said compressed air to reduce the rate of supply of said combustion air to said combustor after the combustion of the primary fuel is commenced; and then commencing the combustion of the secondary fuel.

2. A method as claimed in claim 1, wherein the rate of bleeding of said compressed air is progressively increased in accordance with an increase in speed of said gas turbine from the moment immediately after the commencement of combustion of said primary fuel and is progressively decreased in accordance with an increase in load of said gas turbine from the moment at which the combustion of said secondary fuel is commenced.

3. A method as claimed in claim 2, wherein the rate of bleeding of said compressed air is controlled in relation to the load applied to said gas turbine in such a manner that the rate of bleeding of said compressed air is reduced substantially to zero when the load is below a normal load range of said gas turbine.

4. A method as claimed in claim 1, wherein said compressor has air bleeding means for separately bleeding air from at least two of a low-pressure stage, intermediate-pressure stage and high-pressure stage thereof.

* * * * *